(12) United States Patent
Moore et al.

(10) Patent No.: US 7,019,759 B1
(45) Date of Patent: Mar. 28, 2006

(54) COMPUTER BASED PLAN DESIGN AND SALES METHOD

(75) Inventors: David Moore, Woodbridge, CT (US); Sara Warner-Phillips, Brattleboro, VT (US); Jason Mark, Northampton, MA (US); Robert Archer, Amherst, MA (US); Ryan Moore, Belchertown, MA (US)

(73) Assignee: Original Home LLC, Woodbridge, CT (US)

( * ) Notice: Subject to any disclaimer, the term of this patent is extended or adjusted under 35 U.S.C. 154(b) by 0 days.

(21) Appl. No.: 09/567,185

(22) Filed: May 9, 2000

(51) Int. Cl.
*G09G 5/00* (2006.01)
*G06F 9/00* (2006.01)

(52) U.S. Cl. .................. 345/619; 345/418; 705/26; 700/97; 715/700; 715/748

(58) Field of Classification Search ................ 345/418, 345/419, 420, 427, 428, 581, 619, 679, 620–621, 345/624–625, 629–630, 636, 641, 650, 652, 345/653–655, 661–666, 676–681, 700–702, 345/705, 708, 732, 744, 748–749, 757, 764, 345/765, 866, 751, 501, 531–532, 24; 703/1; 52/236.3, 79.1, 79.12, 236.6; 705/26–27, 705/1, 7–11; 700/97–98, 95; 715/700, 748–749, 715/751
See application file for complete search history.

(56) References Cited

U.S. PATENT DOCUMENTS

| | | | | |
|---|---|---|---|---|
| 4,472,916 A | * | 9/1984 | Krebs | 52/236.6 |
| 4,700,317 A | | 10/1987 | Watanabe et al. | 364/488 |
| 5,341,469 A | | 8/1994 | Rossberg et al. | 395/145 |
| 5,611,035 A | | 3/1997 | Hall | 395/140 |
| 5,682,468 A | | 10/1997 | Fortenbery et al. | 395/119 |
| 5,764,518 A | * | 6/1998 | Collins | 364/468.1 |
| 5,790,132 A | * | 8/1998 | Watson | 345/141 |
| 5,838,973 A | | 11/1998 | Carpenter-Smith et al. | 395/701 |
| 5,847,971 A | | 12/1998 | Ladner et al. | 364/512 |
| 5,877,768 A | | 3/1999 | Jain | 345/421 |
| 5,969,725 A | | 10/1999 | Fujiki et al. | 345/433 |
| 6,073,404 A | * | 6/2000 | Norfleet | 52/236.3 |

(Continued)

FOREIGN PATENT DOCUMENTS

| | | | |
|---|---|---|---|
| JP | 02001216347 | * | 8/2001 |
| JP | 02001222592 | * | 8/2001 |
| KR | 2001016314 | * | 3/2001 |

OTHER PUBLICATIONS

Gajewski et al., "graphics support for a WWW based architectural design service", ProQuest Info&Learning, order no.: AADMQ-31575, vol. 37/02 pp. 631-713, Dec. 16-18, 1996.*

(Continued)

*Primary Examiner*—Matthew C. Bella
*Assistant Examiner*—Sajous Wesner
(74) *Attorney, Agent, or Firm*—Coats & Bennett, P.L.L.C.

(57) ABSTRACT

A method enables online purchase of customizable home construction plans. The method includes accessing a web based software package, customizing the home, and ordering the construction plans. The software package is a second aspect. The software allows the consumer to select different predefined features and add them to a stock floor plan. The selection of different features enables the customization of the home plan. The features selected are displayed to the consumer through a series of layers. The layers are superimposed on each other according to a predefined logic so that the consumer views what the home actually will look like rather an amalgamation of pieces. When the consumer is satisfied with the customized plan, the consumer orders formal plans and construction plans are sent to the consumer.

30 Claims, 10 Drawing Sheets

U.S. PATENT DOCUMENTS

| | | | |
|---|---|---|---|
| 6,253,504 B1 * | 7/2001 | Cohen et al. | 52/143 |
| 6,345,258 B1 * | 2/2002 | Pickens | 705/1 |
| 6,873,971 B1 * | 3/2005 | Tackbary et al. | 705/27 |
| 2001/0034712 A1 * | 10/2001 | Colvin | 705/52 |
| 2002/0010522 A1 * | 1/2002 | Martin | 700/97 |

OTHER PUBLICATIONS

David Marc Loftus, Home plans, Archival Designs, 1999-2001.* www.pkg.com "Full Contact Package Design", Sep. 1997.*

* cited by examiner ent invention relates to a technique for a con-
COMPUTER BASED PLAN DESIGN AND SALES METHOD

BACKGROUND OF THE INVENTION

1. Field of the Invention

The present invention relates to a technique for a consumer to generate customized design drawings and purchase a full set of construction drawings from the customized design drawings, preferably over the Internet.

2. Description of the Related Art

Over the last decade, new homebuyers and builders have concentrated on lowering the initial cost of a new home and on preserving that home's resale value. These buyers and builders are not interested in having their new home be an individual expression of their personal taste, nor are they willing to pay for custom architectural plans. The houses which people actually buy or build have become increasingly standardized and conform to a small number of classic stock plans and types. However, people still want to make small changes to these stock plans so that the house fits their perceived needs.

These trends have fueled the growth of the stock plan industry that sells pre-drawn construction drawings at a fraction of the cost of custom plans drawn from scratch. Traditionally, these plans are generally hand-drafted drawings that are fixed entities and cannot be easily modified or customized to suit the buyer. In the past, if a consumer liked a set of plans, but wanted to make a few changes, it was easier to throw out the old drawings and start over.

However, advances in computer aided drafting (CAD) technology have revolutionized the architectural industry. CAD technology has provided new tools for the production of architectural plans. In the computer era, a few mouse clicks can create a new set of plans from an existing set. Individual sets of plans can be customized by including different layers or features that can be turned on and off as required. A new process of selecting a stock plan is now possible where the buyer literally designs their own home by first choosing a basic style and plan and then choosing the specific architectural features they prefer.

Many new and innovative CAD design applications have been marketed to homebuyers. These products produce a generalized design and floor plans, but most do not contain the tools necessary for drawing a fully detailed, dimensioned, and annotated set of construction drawings. Such drawings are a necessary part of any contract for construction. The products that do contain these tools, such as AUTOCAD® are generally too complicated or time consumptive for a lay person to use for home design.

Additionally, the advent of virtual landscapes and buildings in computer games and other computer related simulations are similar in some regards to home design, but these layouts are not necessarily true to the laws of physics, and certainly have not been rendered in sufficient detail to allow home construction therefrom. Furthermore, virtual buildings are also not something that a casual consumer would be able to create in a short amount of time given presently available tools.

Finally, the emergence of commerce over the Internet, and more specifically over the World Wide Web, has received much attention of late. One of the end results of this emergence is the reduction of the consuming populace in many physically distant localities into one relatively homogenous community, with both a standardization of price and expectation from the consuming body.

Thus, there remains a need for a computer based program accessible over the Internet that would allow a casual consumer to create a customized variation from a stock floor plan, and secure therefrom construction drawings that would enable the consumer to build their customized home.

SUMMARY OF THE INVENTION

The needs of the prior art are addressed by a method enabling the online purchase of customizable home construction drawings. The method includes accessing a web based software package, selecting and then customizing design drawings of the home, and ordering the construction drawings derived from the customized design drawings. A software package is a second aspect of the present invention. The software allows the consumer to select different predefined features and add them to stock design drawings to create customized design drawings. The features selected are displayed to the consumer through a series of stacked layers. The layers are superimposed on each other according to a predefined logic so that the consumer views what the home actually will look like rather than an amalgamation of pieces. When the consumer is satisfied with the customized design drawings, the consumer orders formal construction plans and these construction drawings are sent to the consumer.

DETAILED DESCRIPTION OF THE PREFERRED EMBODIMENTS

The present invention is particularly contemplated as being a web based commerce solution to the desires of consumers to purchase customized construction drawings. The invention has two principle aspects, namely the software that enables the creation of customized design drawings and the method of vending customized construction drawings derived from the customized design drawings to the consumer over the Internet. For full understanding of these two aspects, reference is made to the accompanying drawings.

Figure 1:
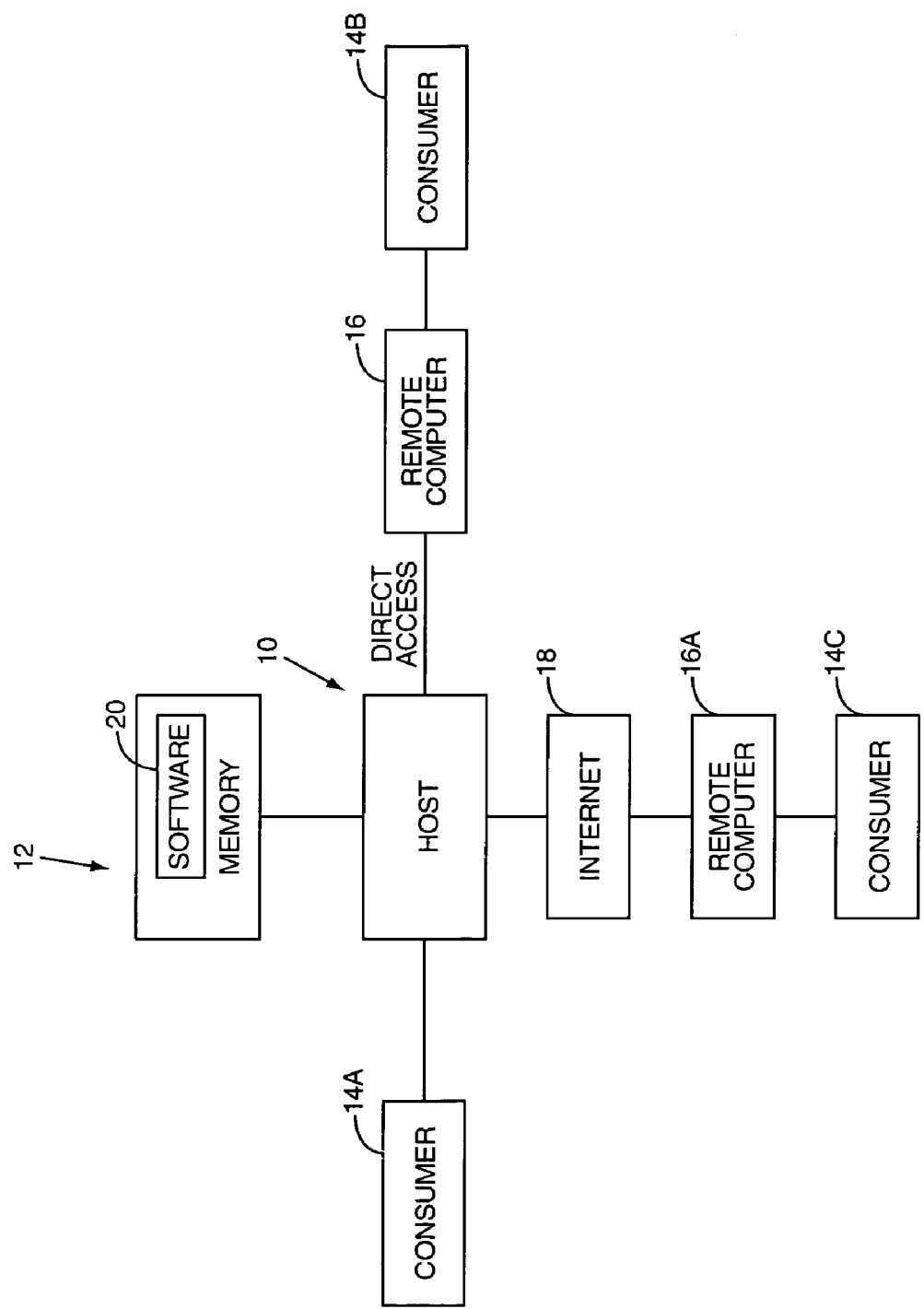
FIG. 1 is a block diagram of the computer network through which the present invention may be accessed.

Specifically, FIG. 1 shows in a block diagram format a host computer 10 including a memory 12 having software 20 stored thereon. There are three principle ways that the host computer 10 may be utilized by a consumer 14. Host computer 10 may be accessed directly by a consumer 14A through a conventional input/output interface such as a keyboard, monitor, and mouse. This may occur for example when a consumer 14 visits the physical location of a builder or designer's office. While not numerous, these walk in consumers do provide an important source of revenue, and should be accommodated.

Alternatively, a consumer 14B may use a remote computer 16 with direct dial in access such as over a modem. Consumer 14B would instruct his remote computer 16 to call the host computer 10 and provide appropriate log in information or other desired access information to establish a connection as is well understood.

Finally, a consumer 14C may use a remote computer 16A to access the Internet 18, such as through an Internet Service Provider, such as BELLSOUTH.NET®, GTE.NET®, or the like. Specifically contemplated would be accessing the World Wide Web with a web browser and from there accessing a web page hosted by the host computer 10. The web page would act as an interface for the software 20. Also contemplated are the consumers 14 who operate their own Internet gateways complete with their own Internet servers.

Host computer 10 may be a personal computer with a microprocessor therein, or may be a dedicated network server or the like as needed or desired. Memory 12 may be a hard drive, CD-ROM, optical CD, floppy disk, or other form of computer memory as is well understood in the field of computers. Software 20 may be written in any appropriate code as needed or desired. It should be appreciated that in all embodiments, personal access, direct dial-in, or Internet web access, the consumer 14 is preferably presented with a uniform interface with which to use the software 20. As operating systems and application software continue to merge, it is contemplated that the consumer interface in all embodiments will emulate or in fact be a function of a web browser, although this is not specifically required by the present invention. It is contemplated that the remote computers 16 and 16A will be personal computers with the appropriate communications software, although as WEB-TV and other existing services attempt to shift the need from client processing power to server provided processing power, the present invention accommodates such alternate devices as well. As will be described below, software 20 may be distributed or located at a unitary site.

Figure 2:
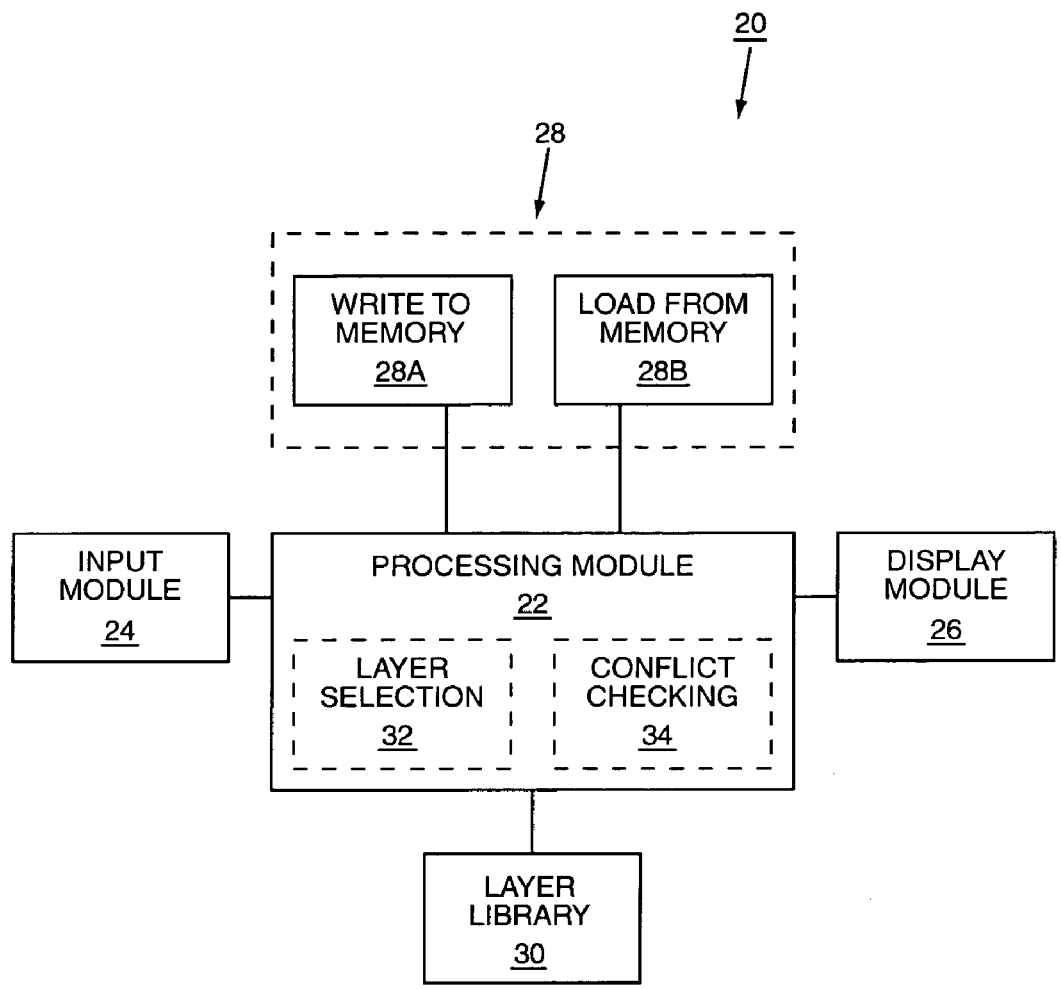
FIG. 2 is a block diagram of the software modules of the present invention.

A brief overview of the general functions of the software 20 will be helpful for understanding of the invention. An exemplary version of the software 20 is better seen in FIG. 2, which depicts some of the modules of the software 20 in block format. Software 20 may include a central processing module 22, an input module 24, a display module 26, a memory access module 28, and a layer library 30.

Processing module 22 receives input from the input module 24 and displays end results with the assistance of the display module 26. It should be appreciated that the input module 24 receives and interprets commands from a keyboard, a mouse, or other input devices as needed or desired. Further, the input module 24 should have the capacity to receive commands locally at the host computer 10 or from a remote computer 16 or 16A. Thus, there may be the appropriate communications software included within the input module 24 if needed. There should additionally be modules within the memory access module 28 designed to write files to memory (28A) and load files from memory (28B). Depending on the particular memory 12 used with the host computer 10, different drivers may be required, but such is considered well within the ordinary skill of one in the computer arts.

Additionally, the processing module 22 may be conceptualized as containing a layer selection module 32 and a conflict checking module 34. These will be explained in greater detail below, but essentially receive the input from the input module 24 to determine the layers selected by the user from the layer library 30 and then determine if there are conflicts therebetween that need to be resolved prior to display by the display module 26.

Figure 3:
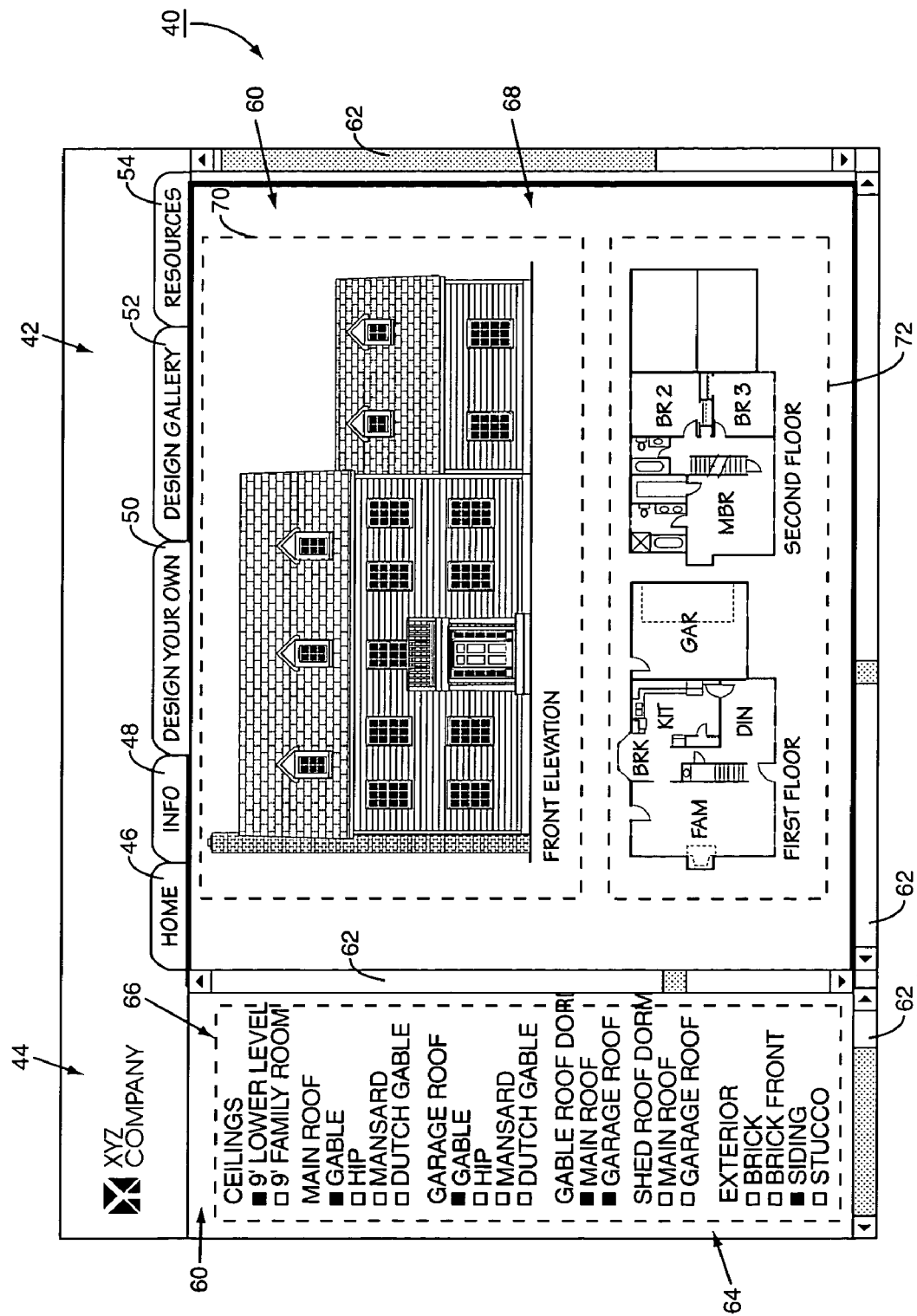
FIG. 3 is an exemplary screen shot from the software of the present invention.

Display module 26 generates a visual representation of the home being designed along with a graphical user interface (GUI) that allows the consumer 14 to customize the home. An exemplary screen shot 40 is seen in FIG. 3. It should be appreciated that the screen shot 40 is sized according to the monitor on which it is displayed and with a suitable color palette. In the preferred embodiment, the screen shot includes a fixed field 42 that includes a logo indicia 44 and a plurality of links to other aspects of the invention such as a "home" link 46, an "info" link 48, a "design your own" link 50 (presently displayed in the active fields), a "design gallery" link 52, and a "resources" link 54. Further, the screen shot 40 includes one or more active fields 60 with scroll bars 62.

The "home" link 46 takes the consumer 14 to a first page of the web site (not shown) that may have a quick promotional advertisement of the provider of the web page with appropriate indicia to make a positive first impression. This would also presumably be the first web page that the consumer 14 would see when reaching the site through the World Wide Web. The "info" link 48 takes the consumer 14 to a page (not shown) that has contact information about the provider of the web page, a brief tour of the services provided by the provider of the web page, and the like. The "design your own" link 50 is displayed as screen shot 40 and allows the consumer 14 to create customized design drawings as will be detailed below. The "design gallery" link 52 takes the consumer 14 to a page (not shown) that allows the consumer to browse a number of different homes that have already been designed by other consumers of the software 20. The "resources" link 54 takes the consumer 14 to a page (not shown) that provides information about builders, home improvements, and links to other web sites that may be helpful to consumers of the software 20.

In the particular screen shot 40, a first active field 64 includes a list of commands 66 that the consumer 14 may manipulate to customize the design drawings. These commands 66 correspond to options or features on the home as will be detailed below. A vertical scroll bar 62 allows the consumer 14 to peruse many more commands 66 than are shown. A second active field 68 shows a front exterior elevational view 70 of the home being customized and also an interior floor plan view 72 of the home being designed. It is expected that the two views 70 and 72 will be too large to be seen easily on one screen so, scroll bars 62 allow the consumer 14 to see the desired view 70, 72, or portions of both as needed or desired. Views 70, 72 are the design drawings that are customized by the consumer 14.

Commands 66 may be implemented by the software 20 or by functions of the consumer's Internet browser. Suitable methods may include check boxes, radio buttons, pulldown menus, or a field allowing direct data entry. The following comprise a list of exemplary commands that could be within the list of commands 66.

The existence and size of a garage (none, one, two, three, or more)
The location of the garage doors (front, side, or rear)
The base plan size (regular, compact, or extended)
The size of the master suite (regular or expanded)
The number of bedrooms (one, two, three, four, or more)
Fireplace (none, steel, brick)
Deck (rear, yes, no)
Bay window in living room (yes, no)
Bay window in breakfast room (yes, no)
French Door between the living room and family room (yes, no)
Bedroom side windows (yes, no)
Nine foot family room ceiling (yes, no)
Main roof (gable end, hip)
Main roof dormers (yes, no)
Wing dormers (yes, no)
Flush Roof Gables (no, small, wide, center, off-center left, off-center right)
Flush Gable upper window (round, half-round, single, round top)
Projected bay (no bay, 2 story bay, with second floor overhang, with columns)
Front door (standard, w/transom window, w/fanlight window, w/pediment trim, recessed)
Projected bay upper window (none, half-round, round)
Window over entry (single, double, archtop, palladian)
Porches (none, full width, full w/cross gable, two story, gable roof, balcony roof)
Reverse plan (switches left/right orientation of plan)
Change Siding Color
Change Roof Color This list is not meant to be exhaustive, but rather exemplary, and other features may be added as developed or requested by the consumers 14. Additional commands such as "save," "delete," "new," "save as," "calculate area," and "order plans" may also be enabled through buttons, links, or other appropriate command entry methods.

The "calculate area" command in particular allows a consumer 14 to determine the square footage of the home currently being displayed. This is helpful when making comparisons between different design drawings.

Figure 4:
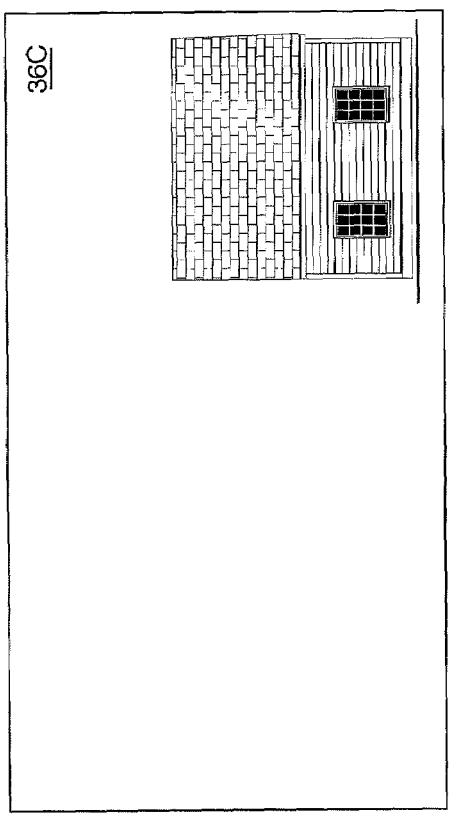
FIG. 4 shows a number of exemplary layers as used by the software of the present invention.
Figure 4:
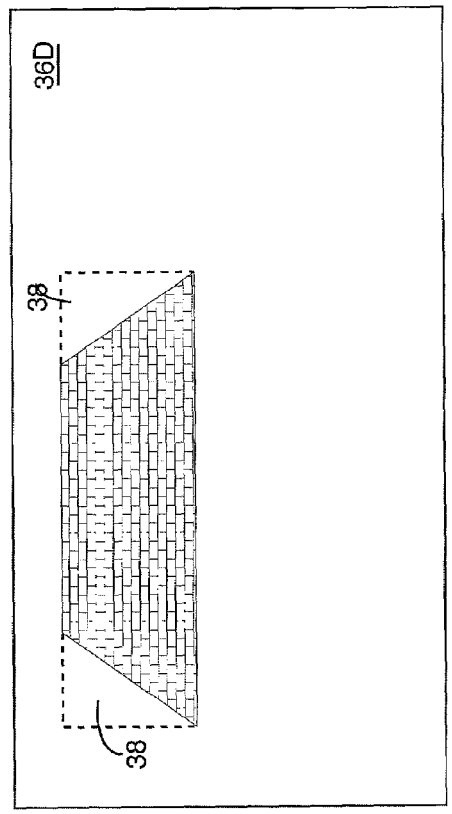
Figure 4:
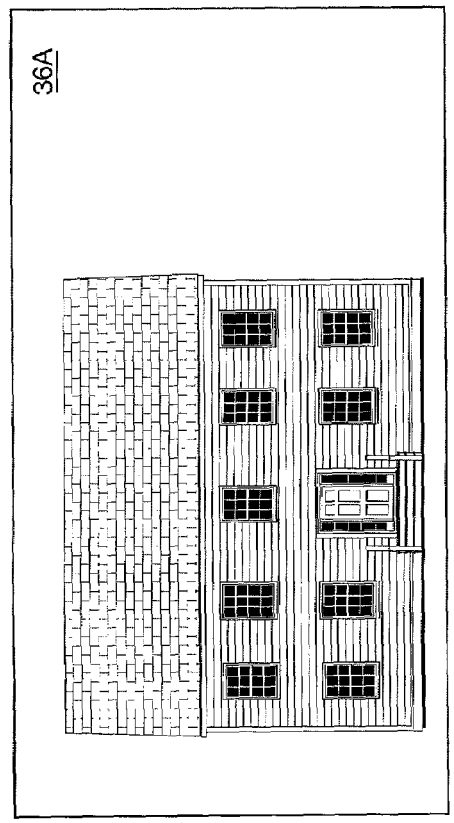
Figure 4:
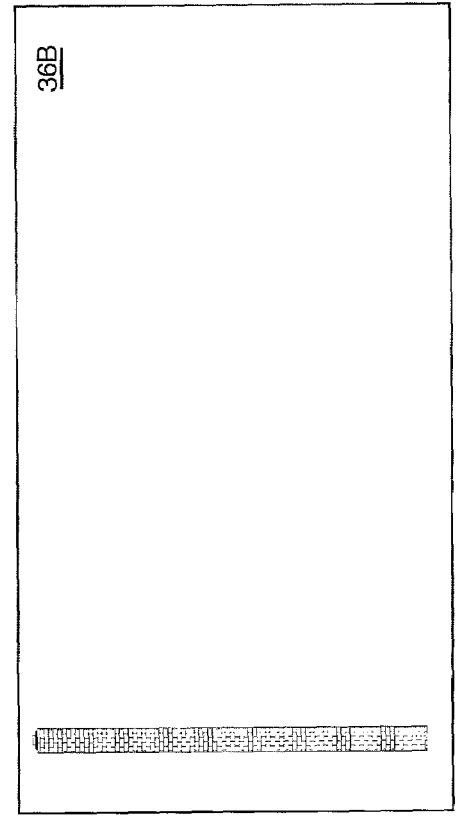

Front elevational view 70 and interior floor plan view 72 are provided and modified by the contents of the layer library 30. As better seen in FIG. 4, layer library 30 includes a plurality of layers 36, only a few of which are actually shown. There is a base layer 36A that represents the core front elevational view of the house, and then a plurality of option or feature layers 36B–36D. For example, feature layer 36B shows the chimney for a fireplace that may be added to the house. Feature layer 36C shows a base garage addition. Feature layer 36D shows a hip roof as opposed to the gable end roof of the default home. It should be appreciated that there are a plethora of feature layers 36 each showing a feature that may be added to the house or substituted for a previously existing element. Not only should the feature layer 36 add the element, but it should also add any appropriate shadows to the front elevational view 70 of the house. In general, each layer 36 contains one feature version although more than one layer 36 may combine to form a feature version. Opaque drawing elements may be positive images or masking areas which block out a portion of the layer(s) 36 below. For example, layer 36D would include masking areas 38 to mask portions of the roof in layer 36A. While not shown, layers 36 also exist for the interior floor plan view 72. While not concerned with the shadows, these floor plan layers must be aware of how the walls of the plan view 72 are changed by any selection made from the list of commands 66. Further, different features may change the effective area of the home, thereby generating a true need for the "calculate area" command.

In the preferred embodiment, the layers 36 are created as individual drawings that can be hand-drawn or computer generated. These drawings are translated or scanned into a common graphical file format such as EPS, JPEG, or GIF.

Figure 5:
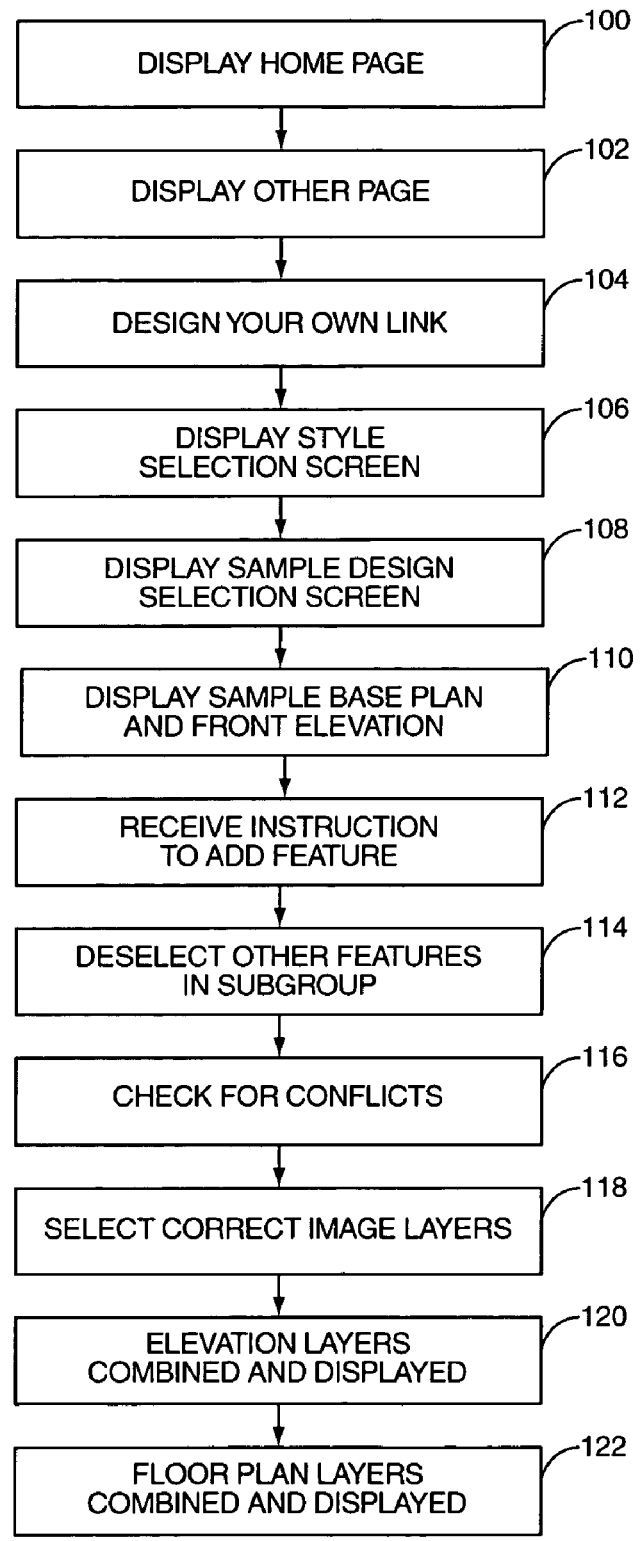
FIG. 5 is a flow diagram of the method of the software of the present invention.

With that overview of the software 20, a more detailed analysis of the steps that the software 20 performs is shown in FIG. 5. Software 20, when initially accessed, will display the home web page (block 100). Further, the software 20 may display the other web pages if the appropriate links 48, 52, or 54 are chosen (block 102). However, the area of interest for the present invention is after the selection of the "design your own" link 50 (block 104).

After receiving the selection of the "design your own" link 50, the software 20 displays an intermediary screen (not shown) asking for the selection of one of a number of styles (block 106). Thus, the screen asks whether an architectural style such as Colonial, Cape Cod, or Contemporary is desired. After receiving an indication as to the desired style, the software 20 displays another intermediary screen (not shown) asking for the selection of one of a number of sample designs (block 108). Each sample design, amongst the available options displayed, conforms to the chosen style and is composed from a particular base design drawing to which a traditional or typical set of features has been added. Each base design drawing is one of a limited number of predetermined core plans. Each core plan has a unique configuration. All base design drawings and core plans are stored in memory 12 and may comprise a plurality of feature layers 36.

After the sample design has been selected, software 20 then displays the front elevation view 70 and the floor plan views 72 of the chosen design (block 110) together with the list of commands 66. Thus, a reasonable approximation of screen shot 40 is presented to the consumer 14. Software 20 then receives instructions to add features to the design drawing (block 112). List of commands 66 is divided into discrete subgroups representing a type of feature, such as two or more different types of roofs. When a particular command in a discrete subgroup is entered, software 20 is preferably programmed to deselect other features within the subgroup (block 114). Thus, two or more features from any given subgroup, such as a gable roof and a hip roof, cannot be selected at the same time. Conflict checking module 34 then looks for conflicts with other features from different subgroups (block 116). For example, the expanded master suite is built over the garage, and you cannot have an expanded suite unless you have a garage. Selection of the master suite option without first selecting a garage will result in a screen message to the consumer 14 describing the conflict and explaining how it will be resolved.

Upon resolution of any conflict, or if no conflict is present, the layer selection module 32 determines the appropriate layers 36 which will be added to the elevation and floor plan views 70, 72 (block 118). The updated stack of elevation layers 36 are combined and displayed (block 120) and the updated stack of floor plan layers 36 are combined and displayed (block 122).

One way in which the information within the processing module 22 could be organized is shown in Table 1. Another name for this table is the Feature Matrix.

TABLE 1

| Base Plan | Feature Set | Feature | Version | Notes | 1 Flr. Plan image layer | 2 Flr. Plan image layer | Elevation image layer | Conflict | Action |
|---|---|---|---|---|---|---|---|---|---|
| Colonial A | Garage | no garage | c-ga-n-01 | | | | | | |
| " | " | 2-car garage | c-ga-2-01 | | c-ga-2-01-1 | c-ga-2-01-2 | c-ga-2-01-e | c-ms-x | Show c-ga-2-02 |
| " | " | 2-car garage | c-ga-2-02 | with expanded master suite | c-ga-2-01-1 | c-ga-2-01-2 | c-ga-2-01-e | c-ms-r | Show c-ga-2-01 |
| " | " | 3-car garage | c-ga-3-01 | | c-ga-3-01-1 | c-ga-3-01-2 | c-ga-3-01-e | c-ms-x | Show c-ga-3-02 |
| " | " | 3-car garage | c-ga-3-02 | with expanded master suite | c-ga-3-01-1 | c-ga-3-01-2 | c-ga-3-01-e | c-ms-r | Show c-ga-3-01 |
| " | Garage Doors | Doors face side | c-gd-s-01 | | c-gd-s-01-1 | | | | |
| " | Garage Doors | Doors face front | c-gd-f-01 | | c-gd-f-01-1 | | | c-ga-3 | Show c-gd-s-01 and print "Doors for 3-car garage must face to the side." |
| " | Master Suite | Regular suite | c-ms-r-01 | | | | | | |
| " | Master Suite | Expanded Suite | c-ms-x-01 | | | | | c-ga-n | Show ms-r-01 and print "The expanded suite is not available without a Garage." |

Figure 6A:
FIGS. 6A & 6B are exemplary drawings showing how a conflict could be resolved.
Figure 6B:
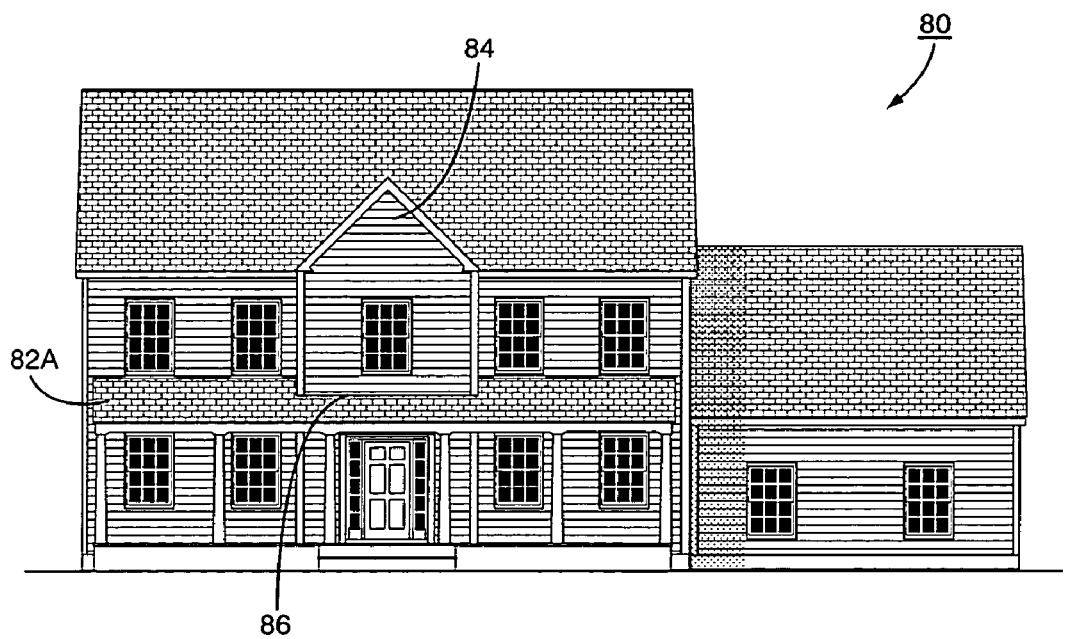

This feature matrix is a relational database containing data about the style and version of the house (base plan), the sets to which each feature belongs (feature set), a list of the basic features, (feature), the different versions of each feature that may result from logical exceptions with other features (version). Other columns identify the layers 36 to apply to the floor plan view 72 (1 Flr. Plan image layer & 2 Flr Plan image layer) and the correct elevation layer 36 (elevation image layer). The processing module 22 reads the entire combination of selected features in the feature matrix to determine if an exception is found to a particular feature. If an exception is found, the matrix will determine the correct version of the feature to display. Exceptions include logical exceptions and graphical exceptions. A logical exception occurs if a selected feature cannot coexist with a previously selected feature. For example, an upper gable window cannot occur if there is no upper gable selected. Selecting both of these options at the same time will cause a logical exception. A graphical exception occurs when a selected feature will coexist with a previously selected feature, but must be modified to do so. For example, the full porch feature must be notched to fit around a projecting bay window, thus requiring a different version of the feature. This can be seen in FIGS. 6A and 6B wherein the example front elevation view 80 includes a full porch 82 in FIG. 6A, but with the addition of the bay window 84, the porch 82A (FIG. 6B) must be notched with a notch 86. In practice, two layers 36 exist for the different versions of the porch 82, 82A.

Once the correct version layer 36 for each feature has been determined, the matrix describes the physical actions to be performed for that version (action column). These may include one or more of the following actions. First, the consumer 14 may receive an informational message on the display. A typical message might state that their selections have resulted in a conflict and describing how the conflict has been resolved. Second, software 20 may reset various form options without alerting the consumer 14. Third, software 20 may define the correct graphic layers 36 required to display the feature version. Alternatively, a "design helper" may be activated to assist a user resolve the conflict. These sorts of assistants are well understood and in effect as a form of artificial intelligence for the software.

While not shown, it is possible to generate three dimensional views, including a walk through of the home based on the chosen plan and the commands 66 chosen. Another command would allow the consumer 14 to rotate the perceived view of the home such that the consumer 14 has a better understanding of the true appearance of the home. Also while not shown, it is possible to provide sectional views of the home at predetermined or consumer determined positions. Buttons or command links may be enabled to effectuate this functionality. Note that the plan, section, elevation, three dimensional views, and other design images are composed of many different graphic layers 36. Each specific combination of layers 36 will create a unique image.

The layers 36 are placed into the display module 26 that allows them to be stacked in the proper order and turned on or off as instructed by the processing module 22 based on the feature matrix. The display module 26 contains separate sets of images for each view of the house, such as floor plans, elevations, or three dimensional models.

To allow the consumer 14 to place an order, it may be required that they must first register or otherwise create an account with the host computer 10. Then when the consumer 14 is satisfied with the order, the customized design drawings may be saved through the use of an appropriate command entry. When saved, the drawings are linked to the account, such as by a pointer. The account may include name, address, other contact information, potentially payment information, age, income, and the like as needed or desired. The user account may serve several functions. First, it may provide valuable information about the users of the present invention. This demographic information may be marketed subject to the appropriate privacy laws, used internally to determine what would make the web site more appealing to certain demographic sections, or other purpose as needed or desired. E.g., if the average annual income is on the order of $500,000, more upscale designs may be added to web site to cater to these customers who may be able to afford larger houses. Second, the user account allows a user to be linked to a saved design. This allows later orders to be sent to the correct individual. Third, repeat visits by consumers 14 are encouraged as they do not have to start from scratch each time they visit the site. They may merely call up saved designs and modify them until satisfaction is achieved.

Figure 7:
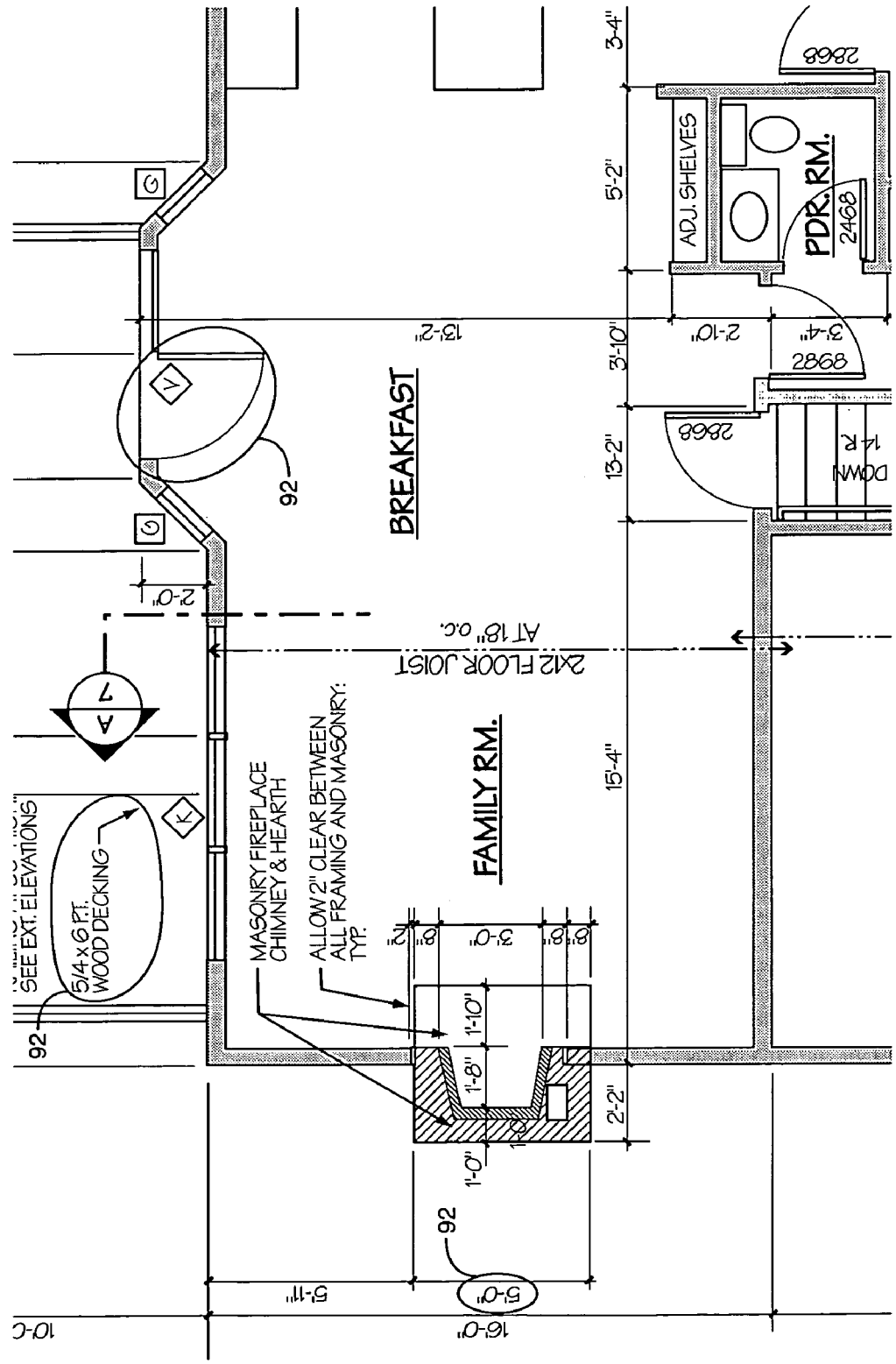
FIG. 7 is an exemplary partial view of the construction drawings generated by the present invention.

When the consumer 14 is satisfied with the end result, he may click on the order command with his mouse pointer and order the construction drawings associated with the customized design drawings he or she has created with the software 20. This generates a set of construction drawings 90 such as are shown in fragmented form in FIG. 7. Construction drawings 90 include details 92 that enable a builder to build a house that the consumer 14 custom designed. It should be appreciated that there would be many pages of construction drawings 90 that may include electrical schematics, plumbing schematics, and the like. These are preferably coded to meet all regulatory building codes and meet filing requirements with local authorities. In the preferred embodiment, the construction drawings 90 are managed in a format similar to the layers 36 of the elevational view 70 or plan view 72, but are not displayed to the consumer 14. Alternatively, construction drawings 90 representing all of the different permutations of commands 66 may be pre-generated and stored in memory 12. Thus, when the order is placed, processing unit 22 evaluates all the options selected and through a look up table or the like locates the desired construction drawings 90 and creates a hard copy or electronic copy for delivery to the consumer 14. Note further, the construction drawings 90 could exist as hard copies and the processing module 22 merely generate a reference number and the original construction drawings 90 could be physically copied, such as by a photocopier or the like for shipping to the consumer 14.

Software 20 can be delivered to the consumer 14 by developing a stand-alone version for installation on the consumer's computer 16 or 16A. Software 20 may include files for layers 36 used to create views 70, 72 and construction drawing sets used to create construction drawings 90. Alternatively, the construction drawings 90 might be purchased separately from an outside source. Software 20 preferably functions through an interaction between the host computer 10 and the consumer's computer 16, 16A. This remote access may also have multiple embodiments. In a first embodiment, the feature matrix, the layer library 30, and the display module 26 form an Internet web site that is located on the host computer 10. A client computer 16, 16A accesses this site over the Internet 18 and individual web pages convey different information. A second embodiment would provide a shell program that is resident on the consumer computer 16, 16A but with instructions to access the layer library 30 and other features of the software 20 on the host computer 10. This embodiment is well suited to including a communications module at the consumer computer 16, 16A such that the communications module contacts the host computer 10 automatically. When a consumer selection is made in either of these two embodiments, the browser software on the consumer computer 16, 16A performs an initial logic check and the resulting selections are sent on to the host computer 10. Host computer 10, and particularly the processing module 22 of the software 20 processes these selections and the correct layers 36 are determined. The display module 26 creates the images from these layers 36 and translates them into an Internet compatible file format such as a GIF or jpeg. The image files are retransmitted to the consumer computer 16, 16A over the Internet 18. When the consumer 14 is satisfied with the final design, matching construction plans 90 may then be ordered over the Internet 18.

Figure 8:
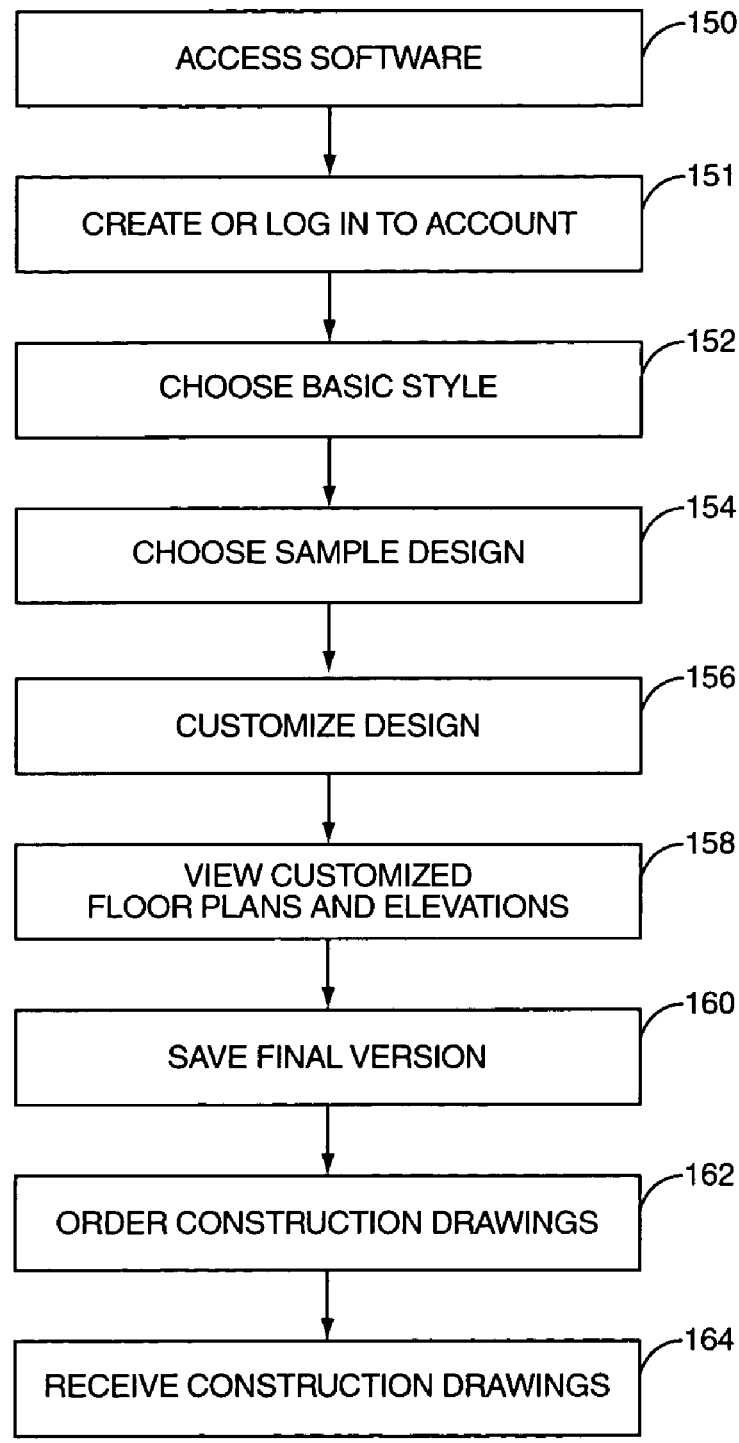
FIG. 8 is a flow diagram of the method of use by the consumer.

Armed with this powerful software tool a home plan seller is well positioned to take advantage of the commercial opportunities available on the Internet. There are a number of ways conceptually to think about the methodology behind the invention. The method as seen from the point of view of the consumer 14 is shown in FIG. 8, wherein the consumer 14 initially accesses the software (block 150). As noted above, this may be done directly at the host computer 10, through a remote computer 16 with a direct dial in access, or through a computer 16A that access a web page through the Internet 18. Further, the software 20 may include components resident on the remote computers 16, 16A as needed or desired. Consumer 14 may at this point create a user account or log in to a previously created user account (block 151). Consumer 14 chooses the basic style (block 152) such as Colonial, Cape Cod, Contemporary, or the like. Then the consumer 14 chooses one of a select number of sample designs (block 154). Consumer 14 then customizes the design drawings (block 156) through the appropriate commands on the list of commands 66. Consumer 14 may then view the customized design drawings including floor plan view 72 and elevational view 70. Upon satisfaction with this design, it may be saved (block 160). While not explicitly shown, the consumer 14 may also view sectional or three-dimensional views of the home as needed or desired. Consumer 14 may then order the construction drawings 90 that would enable building of the home represented by the saved version (block 162). Whether receiving the construction drawings 90 through the mail, a shipping courier, or through some electronic transmission, the consumer 14 then receives the construction drawings 90 (block 164). It should be appreciated that the particular order of many of the commands need not be in the order indicated by the flow chart of FIG. 8, but rather can occur in a nonlinear fashion as the thought occurs to the consumer 14. In particular, the account creation and/or log in need only occur sometime before saving is performed in block 160. Likewise, a number of different design drawings may be saved and compared one against the other by the consumer 14 as needed or desired.

Figure 9:
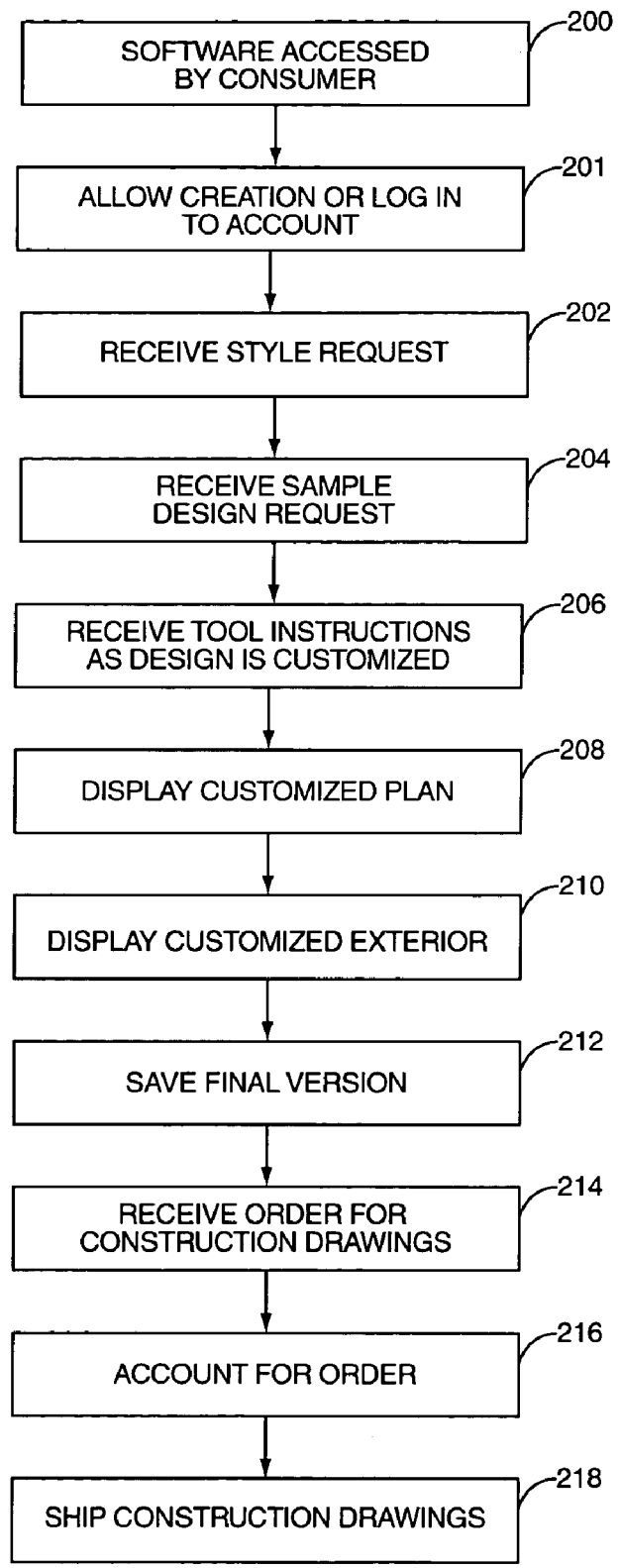
FIG. 9 is a flow diagram of the method of use as seen by the provider.

From the provider side, the method is almost a mirror image of the aforedescribed method. However, the provider side method is set forth explicitly with reference to FIG. 9. The process begins when the software 20 is accessed by the consumer 14 (block 200). The provider may then allow the consumer 14 to create an account or log in to a previously existing account (block 201). Software 20 receives a request for a basic style (block 202) and then receives the request for the sample design (block 204) which is then displayed to the consumer 14. Software 20 then receives command 66 or tool instructions as the design drawings are customized by the consumer 14 (block 206). As the commands 66 are manipulated, the software 20 continues to update and display the customized floor plan view 72 (block 208) and the customized elevational view 70 (block 210). Save to memory module 28A saves a final version (block 212) upon proper command by the consumer 14. Ultimately, the software 20 will receive an order for construction drawings 90 from the consumer 14 (block 214). While heretofore relatively unmentioned, the end goal of the provider of this software 20 is to profit by selling construction drawings 90. Thus, provision for payment and accounting associated with the order must be performed (block 216). This may be done by the method disclosed in U.S. Pat. No. 5,960,411, which is hereby incorporated by reference, or other conventional ways to facilitate e-commerce as is well understood in the art. Finally, the construction drawings 90 must be delivered (block 218). This may be accomplished by shipping, mailing, or electronically sending as needed or desired, or as requested by the consumer 14. Again note that the precise order of events need not occur as linearly as indicated, but rather the present flow charts are provided as examples. In particular, the account creation and/or log in to previously existing accounts may occur at any time prior to the save step of block 212.

Figure 10:
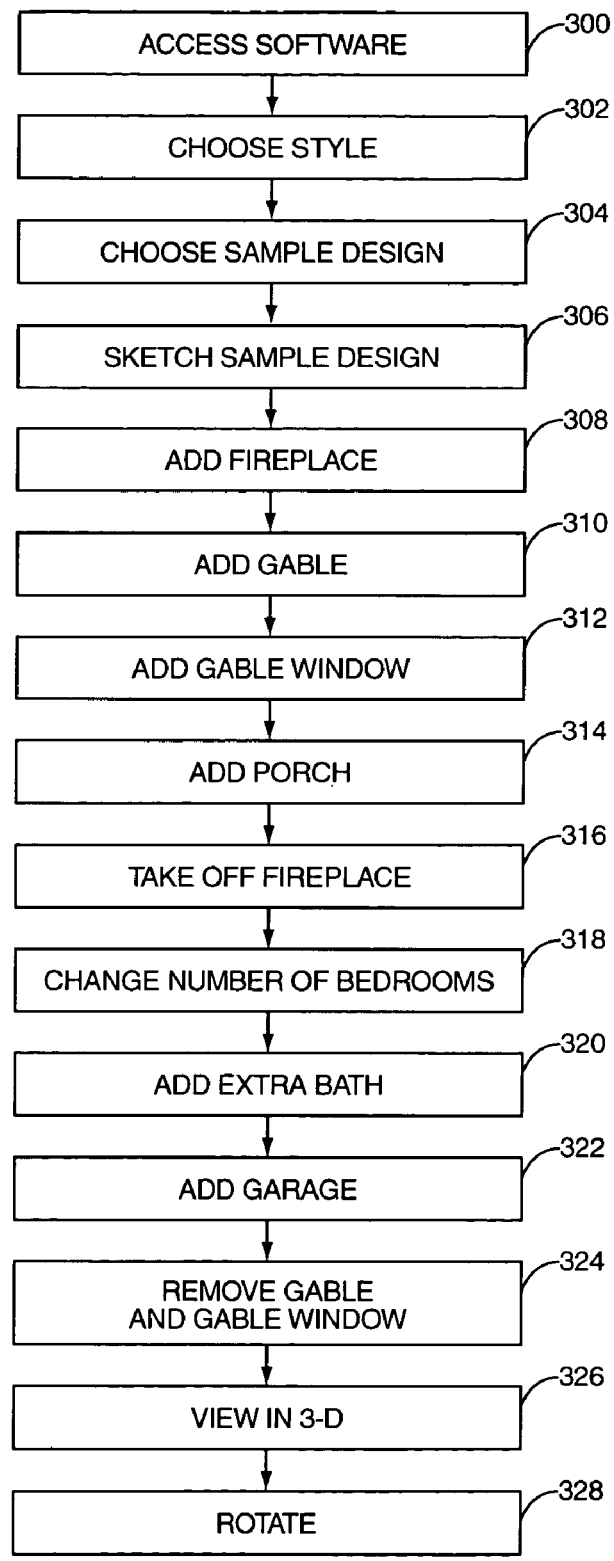
FIG. 10 is an exemplary flow diagram illustrating the software of the present invention in use by an ordinary consumer.

While the above examples have been at a fairly abstract level of analysis, it may be helpful to go through one example to better understand the present invention. A flow chart of this example is seen in FIG. 10. The process begins when the consumer 14 accesses the software 20 as previously described (block 300). Consumer 14 clicks on the "design your own" link 50 and subsequently selects a style (block 302). Consumer 14 then chooses a sample design (block 304) and stretches it by choosing an expanded version of the sample design (block 206). Consumer 14 is faced with a number of options through the list of commands 66, but initially decides that they want a fireplace, so the appropriate check box is clicked and a fireplace is added (block 308). Not happy with merely that change, the consumer 14 adds a gable (block 310) and a gable window (block 312), although the default round gable window is satisfactory to the consumer 14, so no changes are made to that feature. Consumer 14 subsequently adds a porch (block 314) and decides that the fireplace looks out of place, so removes the fireplace (block 316). Consumer 14 then decides that they want a different number of bedrooms and the corresponding change is made (block 318). With more bedrooms, more bathrooms are needed, so the consumer 14 adds an extra bathroom (block 320). Consumer 14 lives in the north and desires a garage, so a garage is added (block 322). Consumer 14 then decides to remove the gable and gable window (block 324). Removing the gable alone creates a prompt that the gable window must also be removed. Satisfied with these results, the consumer 14 then generates a three dimensional view of the house (block 326) and rotates (block 328). Consumer 14 is happy with all these results and saves the design drawing. Subsequently, the consumer 14 orders the construction drawings 90 and provides appropriate financial information such that the provider may be paid for the construction drawings 90. The provider then delivers the construction drawings 90 to the consumer 14 and eventually a home is built according thereto.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of vending customized home construction drawings using a computer having a display and a processor, said method comprising:
    displaying a sample design for a home on a computer display for viewing by a consumer;
    receiving instructions at said processor from the consumer customizing said sample home design to create customized home design drawings;
    displaying to the consumer the customized home design drawings; and
    receiving an order, originating at least partially from the computer, for home construction drawings derived from the customized home design drawings.

2. The method of claim 1 further comprising delivering the home construction drawings to the consumer.

3. The method of claim 1 further comprising saving the customized home design drawings.

4. The method of claim 1 wherein displaying to the consumer the customized home design drawings comprises displaying to the consumer the customized home design drawings on the monitor.

5. The method of claim 1 wherein displaying to the consumer the customized home design drawings comprises displaying a plurality of superimposed feature layers.

6. The method of claim 1 further comprising providing software on a host computer accessible directly by the consumer.

7. The method of claim 1 further comprising providing software on a host computer accessible indirectly by the consumer.

8. The method of claim 7 wherein providing software on a host computer accessible indirectly by the consumer comprises allowing direct dial in access by a remote computer.

9. The method of claim 7 wherein providing software on a host computer accessible indirectly by the consumer comprises allowing access over the Internet.

10. The method of claim 2 wherein delivering the home construction drawings to the consumer comprises mailing the home construction drawings to the consumer.

11. The method of claim 2 wherein delivering the home construction drawings to the consumer comprises electronically delivering the home construction drawings to the consumer.

12. The method of claim 2 wherein delivering the home construction drawings to the consumer comprises delivering the home construction drawings via a courier.

13. A computer readable medium comprising software adapted to:
    display a sample home design to a consumer;
    accept consumer instructions to modify the sample home design in at least one of a plurality of predetermined parameters;
    display customized home design drawings to the consumer based on said consumer instructions;
    receive an order, originating at least partially from the computer, for home construction drawings derived from said customized home design drawings; and
    generate said home construction drawings for delivery to said consumer.

14. The computer readable medium of claim 13 wherein said software is further adapted to display the customized home design drawings by presenting a plurality of feature layers as a single image, each of said plurality of feature layers representing different features of said customized home design drawings.

15. The computer readable medium of claim 14 wherein said software is further adapted to resolve conflicts that exist between different ones of said plurality of feature layers.

16. The computer readable medium of claim 15 wherein resolving conflicts generates a prompt to the consumer to resolve the conflict.

17. The computer readable medium of claim 15 wherein resolving conflicts displays a message to the consumer relating how the conflict was resolved.

18. The computer readable medium of claim 13 wherein said software is further adapted to display a list of commands to the consumer to facilitate customization of the design drawings.

19. The computer readable medium of claim 18 wherein said list of commands and said design drawings are displayed simultaneously.

20. The computer readable medium of claim 13 wherein said home design drawings comprise a front elevational view of a home.

21. The computer readable medium of claim 20 wherein said home design drawings further comprise a plan view of a home and said plan view and said front elevational view are displayed simultaneously.

22. The computer readable medium of claim 13 wherein displaying the home design drawings comprises displaying the home design drawings on a web page.

23. A computer comprising a display and an input device, said computer programmed to:
  display a sample home design to a consumer;
  accept consumer instructions to modify the sample home design in at least one of a plurality of predetermined parameters;
  display customized home design drawing to the consumer based on said consumer instructions;
  receive an order, originating at least partially from the computer, for home construction drawings derived from said customized home design drawings; and
  generate the home construction drawings for delivery to said consumer.

24. The method of claim 1 including generating home construction drawings based on the customized home design drawings created by the consumer.

25. The method of claim 24 including causing the home construction drawings to be delivered to the consumer.

26. A method of facilitating generation of customized home plans, comprising:
  storing a sample home design image in memory;
  storing a plurality of feature layers in memory;
  receiving instructions via a computer from a consumer applying a feature associated with at least one of said feature layers to said sample home design image; and
  displaying a customized composite image formed by at least one feature layer superimposed on said sample home design image.

27. The method of claim 26 further comprising presenting a list of commands to said consumer.

28. The method of claim 26 further comprising storing a plurality of sample home design images in memory.

29. The method of claim 28 further comprising receiving a selection from a consumer of one of said plurality of sample home design images.

30. The method of claim 26 further comprising using a feature matrix to detect conflicts between different ones of said feature layers.

* * * * *